United States Patent
Kang et al.

(10) Patent No.: US 7,253,571 B2
(45) Date of Patent: Aug. 7, 2007

(54) WIRELESS POWER SUPPLY AND METHOD OF SUPPLYING POWER

(75) Inventors: Byung-Chang Kang, Yongin-si (KR); Dong-Soo Shin, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/267,294

(22) Filed: Nov. 7, 2005

(65) Prior Publication Data
US 2006/0097667 A1 May 11, 2006

(30) Foreign Application Priority Data
Nov. 10, 2004 (KR) .................. 10-2004-0091555

(51) Int. Cl.
*H05B 39/00* (2006.01)
*G01R 31/02* (2006.01)

(52) U.S. Cl. .............. 315/312; 315/312; 324/415; 324/418

(58) Field of Classification Search ............ 315/312, 315/149, 156, 159, 150, 294; 250/208.1
See application file for complete search history.

(56) References Cited

U.S. PATENT DOCUMENTS

| | | | | |
|---|---|---|---|---|
| 4,674,828 A | * | 6/1987 | Takahashi et al. | 385/18 |
| 5,383,044 A | * | 1/1995 | Borchardt et al. | 398/111 |
| 5,407,730 A | * | 4/1995 | Imanaka | 428/209 |
| 5,742,044 A | * | 4/1998 | Battersby | 250/208.1 |
| 5,990,571 A | * | 11/1999 | Sato et al. | 307/10.1 |
| 6,046,730 A | * | 4/2000 | Bowen et al. | 345/168 |
| 6,583,573 B2 | * | 6/2003 | Bierman | 315/149 |
| 6,740,860 B2 | * | 5/2004 | Kobayashi | 250/214.1 |
| 7,045,975 B2 | * | 5/2006 | Evans | 315/312 |
| 2005/0275405 A1 | * | 12/2005 | Hiramatsu | 324/415 |
| 2006/0089726 A1 | * | 4/2006 | Hatemata et al. | 700/13 |

FOREIGN PATENT DOCUMENTS

| KR | 1993-0008140 | 8/1993 |
|---|---|---|
| KR | 2002-0057683 | 7/2002 |

OTHER PUBLICATIONS

Korean Office action for Korean Patent Application No. KR 10-2004-0091555 dated Jun. 28, 2006.

* cited by examiner

*Primary Examiner*—Tho Phan
*Assistant Examiner*—Chuc Tran
(74) *Attorney, Agent, or Firm*—Robert E. Bushnell, Esq.

(57) ABSTRACT

A wireless power supply and method of wirelessly supplying power use light to directly supply power wirelessly to an electrical apparatus without a power cable. The wireless power supply includes: a plurality of pressure switches adapted to switch ON/OFF in response to an applied pressure; and a plurality of light emitting devices respectively connected to the plurality of pressure switches, the plurality of light emitting devices adapted to emit light to supply the power to a load in response to at least one of the pressure switches being switched ON.

12 Claims, 4 Drawing Sheets

WIRELESS POWER SUPPLY AND METHOD OF SUPPLYING POWER

CLAIM OF PRIORITY

This application makes reference to, incorporates the same herein, and claims all benefits accruing under 35 U.S.C. §119 from an application for WIRELESS POWER SUPPLY DEVICE AND METHOD earlier filed in the Korean Intellectual Property Office on 10 Nov. 2004 and there duly assigned Serial No. 2004-0091555.

BACKGROUND OF THE INVENTION

1. Field of the Invention

The present invention relates to a wireless power supply and a method of wirelessly supplying power, and more particularly, to a wireless power supply and a method of wirelessly supplying power using light to directly supply power wirelessly to an electrical apparatus.

2. Description of the Related Art

In accordance with a ubiquitous-oriented current technology trend, wireless technology has become available in a Wireless Local Area Network (WLAN), a wireless mouse, a wireless keyboard and a remote control, in terms of network connection and various controls. However, a power cable must be attached to each apparatus and connected to a power source to supply power to each apparatus. Accordingly, power cables become entangled on a desk used for various business machines, such as notebooks, PDAs, cellular phones, printers, and facsimile machines, so that it looks unsightly as well as being inconvenient due to positional limitations of the business machines. Furthermore, it is difficult to arrange the desk and other office areas due to a large number of cables. In addition, a short circuit of a power cable or a plug malfunction can lead to reduced machine availability, and an overall reduced office efficiency and inefficient usage of the office space.

SUMMARY OF THE INVENTION

It is, therefore, an object of the present invention to provide a wireless power supply capable of enhancing apparatus availability and office efficiency and efficiently utilizing an office space by using light to directly supply power wirelessly to an electrical apparatus.

As an embodiment according to the present invention, a wireless power supply comprises: a plurality of pressure switches adapted to switch ON/OFF in response to an applied pressure; and a plurality of light emitting devices respectively connected to the plurality of pressure switches, the plurality of light emitting devices adapted to emit light to supply the power to a load in response to at least one of the pressure switches being switched ON.

The plurality of pressure switches and light emitting devices can be arranged in an array.

The plurality of pressure switches can comprise a plurality of piezoelectric switches.

The plurality of light emitting devices can comprise a plurality of light emitting diodes.

The plurality of light emitting devices can comprise a plurality of laser diodes.

As another embodiment according to the present invention, a wireless power supply comprises: a photoelectric converter adapted to convert a received optical signal into an electrical signal; and a power supply adapted to supply the converted electrical energy from the photoelectric converter to a load.

The photoelectric converter can comprise a solar cell.

As still another embodiment according to the present invention, a wireless power supply comprises: a power supply pad having a plurality of pressure switches and a plurality of light emitting devices, the plurality of pressure switches adapted to being switched ON/OFF in response to an applied pressure, the plurality of light emitting devices being respectively connected to the plurality of pressure switches, the plurality of light emitting devices adapted to emit light in response to at least one of the pressure switches being switched ON; and a photoelectric converter adapted to receive light emitted from at least one light emitting device and to convert the received light into electrical energy and to supply the electrical energy to a load.

The power supply pad can comprise a pad including the plurality of pressure switches and light emitting devices arranged in an array.

A transparent protective layer can be arranged on a top surface of the power supply pad, is the transparent protective layer adapted to protect the plurality of light emitting devices and pressure switches.

The plurality of light emitting devices can comprise a plurality of light emitting diodes.

The plurality of light emitting devices can comprise a plurality of laser diodes.

The plurality of pressure switches can comprise a plurality of piezoelectric switches.

The photoelectric converter can comprise a solar cell.

As yet another embodiment according to the present invention, a method of wirelessly supplying power to a load comprises: switching a plurality of pressure switches ON/OFF in response to an applied pressure; emitting light in response to at least one of the pressure switches being switched ON; receiving the optical signal and converting it into electrical energy; and supplying the converted electric energy to supply the power to the load.

The plurality of pressure switches can comprise a plurality of piezoelectric switches.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF INVENTION

Hereinafter, the configuration and operation of embodiments of the present invention will be described in more detail with reference to the accompanying drawings. It should be noted that like numbers refer to like elements throughout the drawings.

Figure 1:
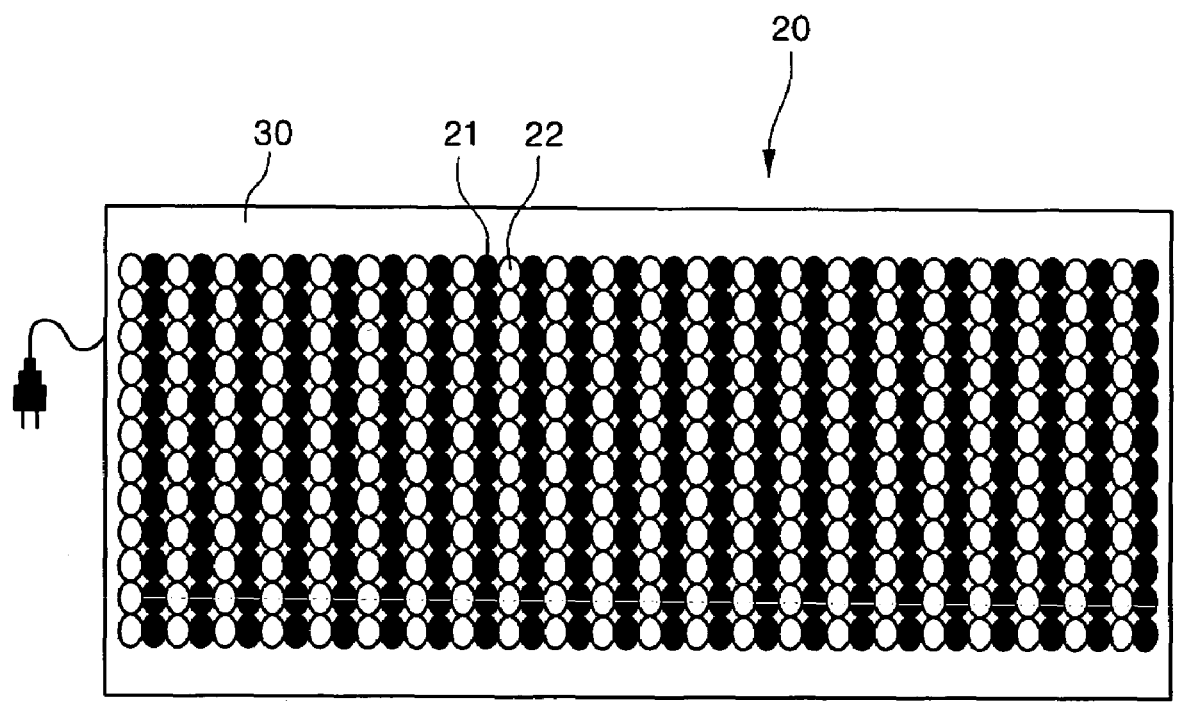
FIG. 1 is a view of a wireless power supply according to the present invention.
Figure 2:
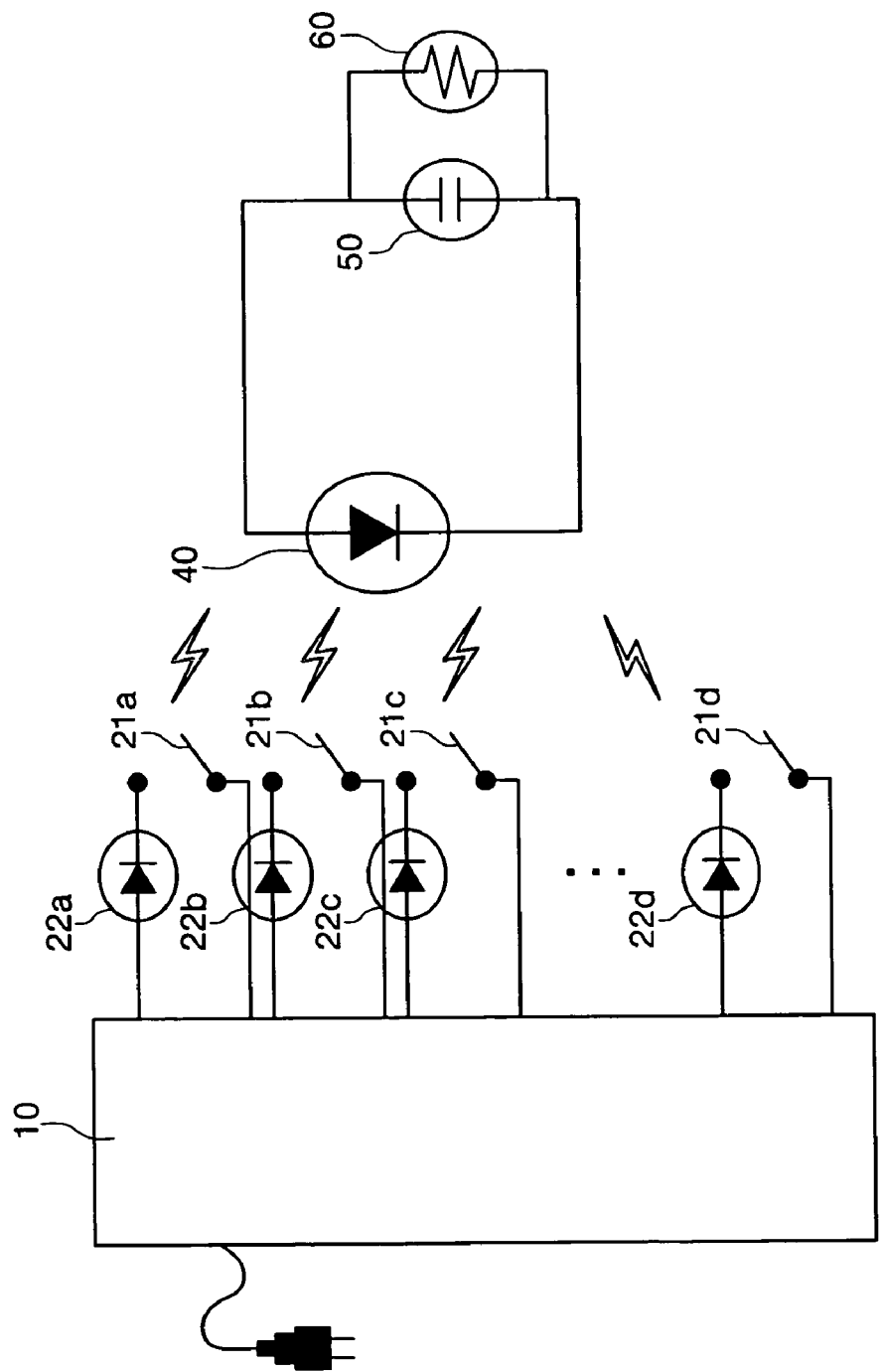
FIG. 2 is a circuit diagram of a wireless power supply according to an embodiment of the present invention.

FIG. 1 is a view of a wireless power supply according to an embodiment of the present invention, and FIG. 2 is a circuit diagram of a wireless power supply according to an embodiment of the present invention.

As shown in FIGS. 1 and 2, the wireless power supply includes: a power supply 10 for supplying AC power; a power supply pad 20 having a pad shape where a plurality of pressure switches 21 and a plurality of Light Emitting Diodes (LEDs) 22 are arranged in an array; and a transparent protective layer 30 formed on the power supply pad 20 to protect the pressure switches 21 and the LEDs 22 of the power supply pad 20.

The power supply pad 20 receives power from the power supply 10. In other words, as shown in FIG. 2, a plurality of light emitting diodes 22a, 22b, 22c, . . . , and 22n of the power supply pad 20 respectively convert electrical energy supplied from the power supply 10 into optical energy to emit the light, and a plurality of pressure switches 21a, 21b, 21c, . . . , and 21n connected in one-to-one correspondance to the plurality of light emitting diodes 22a, 22b, 22c, . . . , and 22n maintain an OFF state when not pressed, but when pressed, only the pressed pressure switches maintain an ON state.

The transparent protective layer 30 is attached on the top surface of the power supply pad 20 having a pad shape where the plurality of pressure switches 21 and the plurality of LEDs 22 are arranged in an array, to protect the plurality of pressure switches 21 and LEDs 22. The protective layer 30 is transparent to allow light emitted from the LEDs 22 to be transmitted when the pressure switches are pressed.

In particular, the power supply pad 20 of the present invention refers to various types of pads where the plurality of pressure switches and the light emitting diodes are formed and arranged in an array.

Furthermore, the light emitting devices of the present invention can be laser diodes (LDs) as well as LEDs, and more generally, can be any light emitting devices that emit light using electricity.

The pressure switch of the present invention includes a pressure switch, a piezoelectric switch, and so one, and more generally, includes all pressure switches having a switching effect in response to pressure.

Furthermore, as shown in FIG. 2, the load that receives the power wirelessly from the power supply pad 20 includes a solar cell module 40 for converting the light emitted from the light emitting diodes 22a, 22b, 22c, . . . , and 22n of the power supply pad 20 into electrical energy; and a charger 50 for charging the electrical energy converted and supplied from the solar cell module 40 to supply to the load 60. The solar cell module 40 refers to a module arranged with various types of solar cells for converting the received light into electrical energy.

In other words, when the solar cell module 40 is adhered to various business machines such as PDAs, cellular phones, printers, and facsimile machines that a user wishes to use to receive power wirelessly from the load, the power can be supplied wirelessly from the power supply pad 20.

According to the described present invention, the pressure switch formed in the power supply pad 20 is in contact with a portion of the load side where the solar cell is located, so that the power is supplied only to the portion where the solar cell is located. Therefore, unnecessary power consumption is reduced, and stability is enhanced.

Figure 3:
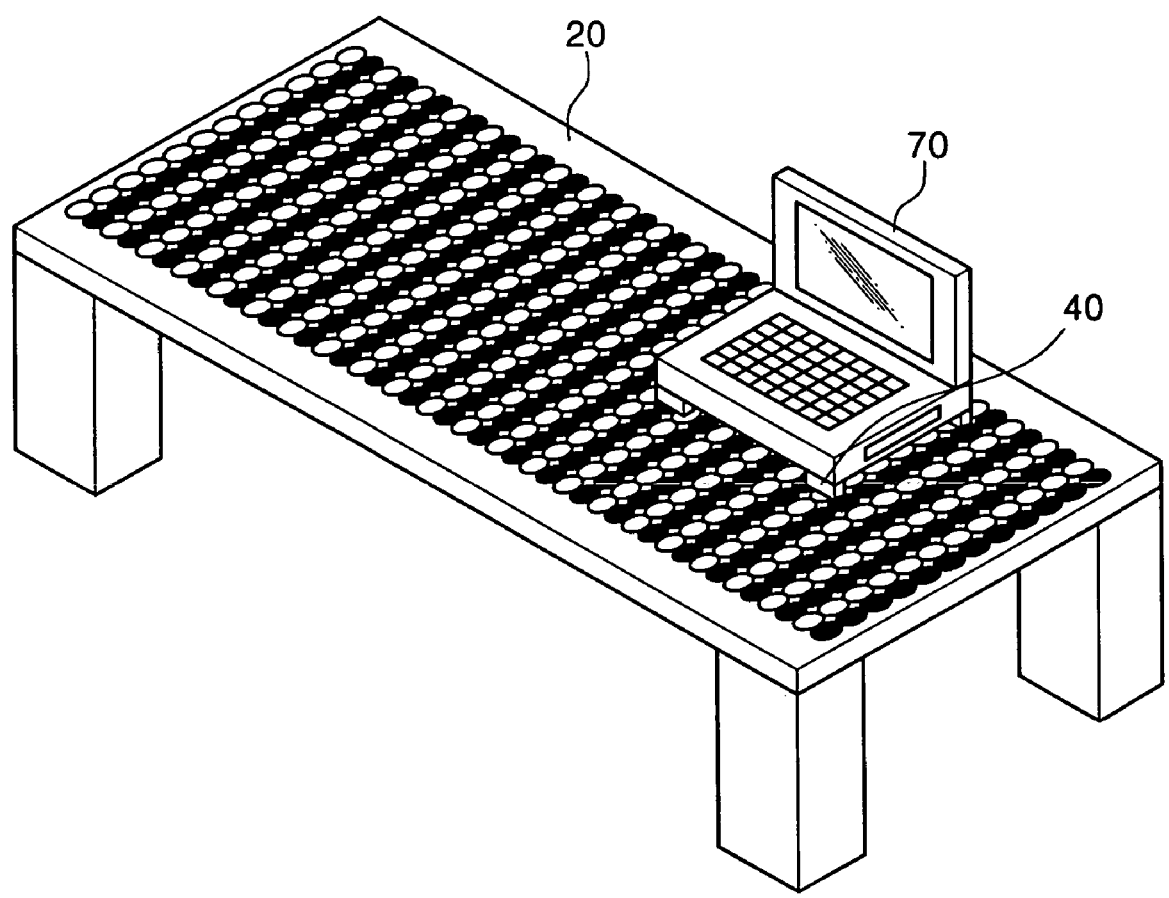
FIG. 3 is a view of an exemplary wireless power supply according to an embodiment of the present invention.
Figure 4:
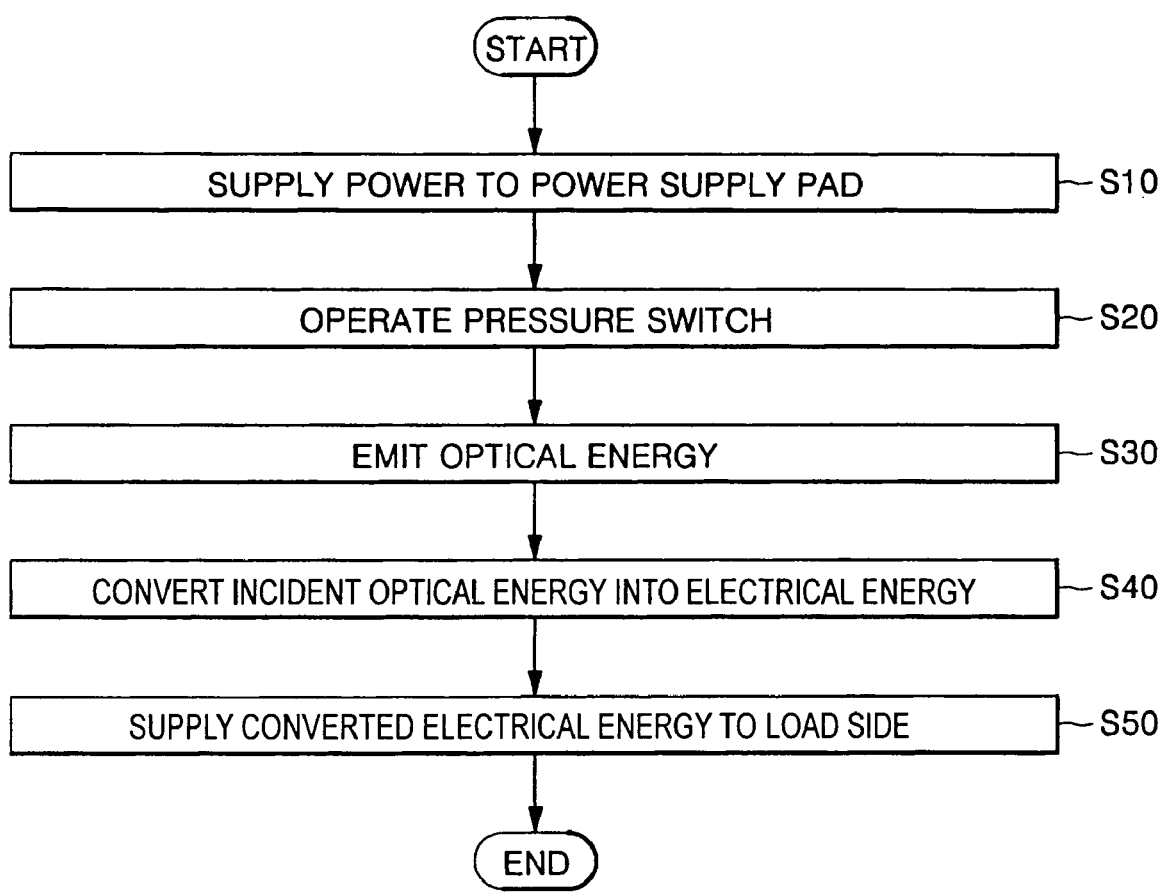
FIG. 4 is a flowchart of a method of wirelessly supplying power according to an embodiment of the present invention.

FIG. 3 is a view of an exemplary wireless power supply according to an embodiment of the present invention, and FIG. 4 is a flowchart of a method of wirelessly supplying power according to an embodiment of the present invention.

As shown in FIGS. 3 and 4, the power supply pad 20 of the present invention is arranged on the desk, and then a power switch is turned ON to use a notebook 70 on the desk with the power supplied (S10). The solar cell module 40 is arranged on the bottom surface of the notebook 70.

In other words, when the notebook 70 is put on the power supply pad 20, only the pressure switches pressed by the solar cell module 40 of the notebook 70 are placed in an ON state (S20).

Accordingly, light emitted from the light emitting diodes respectively connected to the pressure switches pressed by the solar cell module 40 (S30) is incident to the solar cell module 40 of the notebook 70. The light incident to the solar cell module 40 is converted into electrical energy (S40) and supplied to the charger (S50), and the charger supplies power to the load of the notebook 70 to cause the notebook to operate.

Subsequently, when the user lifts the notebook 70 from the power supply pad 20, the pressure switches previously pressed by the solar cell module 40 of the notebook 70 are placed in the OFF state. Thus, light is not transmitted to the solar cell module 40 of the notebook 70. In this manner, the power can be supplied wirelessly to various business machines such as PDAs, cellular phones, printers, and facsimile machines.

As described above, while the present invention has been described in the context that the power is supplied wirelessly to the load side only when the pressure switch is pressed, the power can be supplied wirelessly to the load side by causing optical energy to be emitted from the power supply pad 20 in real time irrespective of whether the pressure switch is pressed.

According to the present invention, the power is directly supplied to the electrical apparatus in a wireless manner with light and without a power cable, thereby enabling an efficient arrangement of various apparatuses, and enhancing space availability. Furthermore, the apparatus is not limited in use due to a short circuit or a plug malfunction so that the apparatus availability is enhanced and efficiency is maximized.

Exemplary embodiments of the present invention have been illustrated and described. However, the present invention is not limited hereto, and those skilled in the art will appreciate that various modifications can be made without departing from the spirit of the present invention, which is included in the following claims.

What is claimed is:

1. A wireless power supply comprising:
   a plurality of pressure switches adapted to switch ON/OFF in response to an applied pressure; and
   a plurality of light emitting devices respectively connected to the plurality of pressure switches, the plurality of light emitting devices adapted to emit light to supply the power to a load in response to at least one of the pressure switches being switched ON, wherein the plurality of pressure switches comprise a plurality of piezoelectric switches.

2. The wireless power supply according to claim 1, wherein the plurality of pressure switches and light emitting devices are arranged in an array.

3. The wireless power supply according to claim 1, wherein the plurality of light emitting devices comprise a plurality of light emitting diodes.

4. The wireless power supply according to claim 1, wherein the plurality of light emitting devices comprise a plurality of laser diodes.

5. A wireless power supply comprising:
- a power supply pad having a plurality of pressure switches and a plurality of light emitting devices, the plurality of pressure switches adapted to being switched ON/OFF in response to an applied pressure, the plurality of light emitting devices being respectively connected to the plurality of pressure switches, the plurality of light emitting devices adapted to emit light in response to at least one of the pressure switches being switched ON; and
- a photoelectric converter adapted to receive light emitted from at least one light emitting device and to convert the received light into electrical energy and to supply the electrical energy to a load.

6. The wireless power supply according to claim 5, wherein the power supply pad comprises a pad including the plurality of pressure switches and light emitting devices arranged in an array.

7. The wireless power supply according to claim 5, wherein a transparent protective layer is arranged on a top surface of the power supply pad, the transparent protective layer adapted to protect the plurality of light emitting devices and pressure switches.

8. The wireless power supply according to claim 5, wherein the plurality of light emitting devices comprise a plurality of light emitting diodes.

9. The wireless power supply according to claim 5, wherein the plurality of light emitting devices comprise a plurality of laser diodes.

10. The wireless power supply according to claim 5, wherein the plurality of pressure switches comprise a plurality of piezoelectric switches.

11. The wireless power supply according to claim 5, wherein the photoelectric converter comprises a solar cell.

12. A method of wirelessly supplying power to a load, the method comprising:
- switching a plurality of pressure switches ON/OFF in response to an applied pressure;
- emitting light in response to at least one of the pressure switches being switched ON, wherein the plurality of pressure switches comprise a plurality of piezoelectric switches;
- receiving the optical signal and converting it into electrical energy; and
- supplying the converted electric energy to supply the power to the load.

* * * * *